L. H. WHEELER
Wind-Mills.
No. 5,531. Reissued August 12, 1873.
Fig. 1.
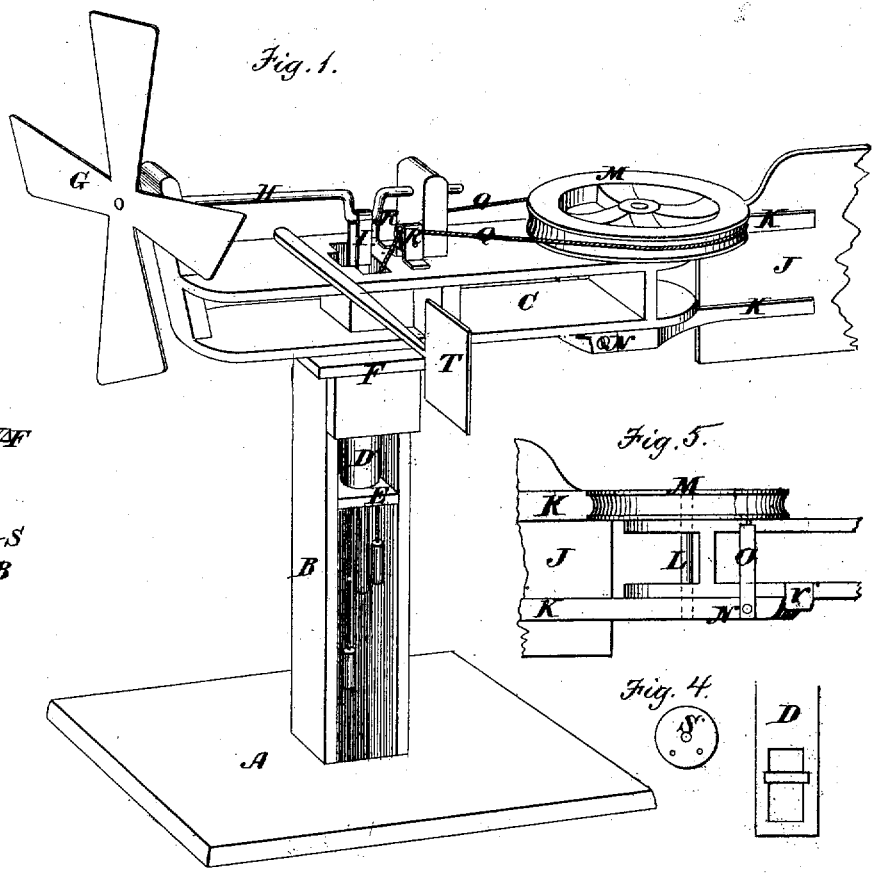
Fig. 3.
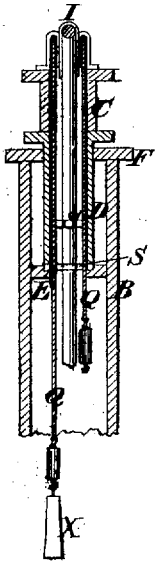
Fig. 5.
Fig. 4.
Fig. 2.
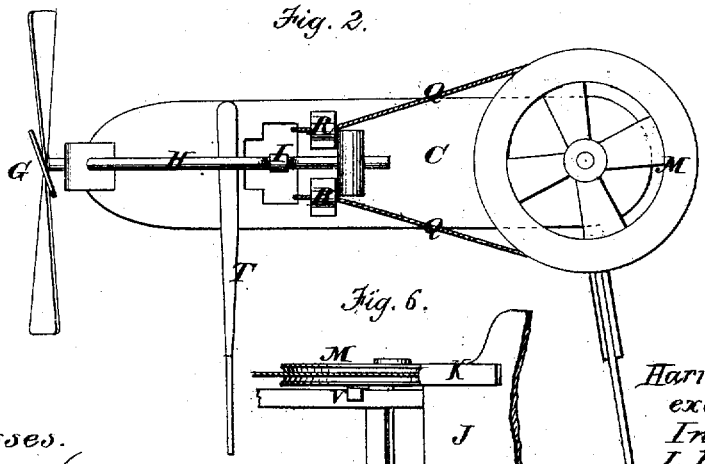
Fig. 6.
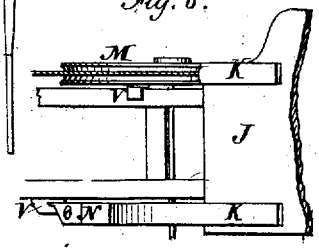
Witnesses.
C. F. Brown
M. Church
Harriet W. Wheeler
executrix of
Inventor.
L. H. Wheeler dec'd.
by her Attys.
Hill & Ellsworth.
THE NORRIS PETERS CO., PHOTO-LITHO., WASHINGTON, D. C.

UNITED STATES PATENT OFFICE.

HARRIET W. WHEELER, EXECUTRIX, AND WILLIAM H. WHEELER, OF BELOIT, WIS., ASSIGNEE OF ONE-THIRD INTEREST OF LEONARD H. WHEELER, DECEASED.

IMPROVEMENT IN WINDMILLS.

Specification forming part of Letters Patent No. 68,674, dated September 10, 1867; reissue No. 5,531, dated August 12, 1873; application filed March 17, 1873.

DIVISION A.

*To all whom it may concern:*

Be it known that LEONARD H. WHEELER, of Beloit, in the county of Rock and State of Wisconsin, did invent certain new and useful Improvements in Windmills; and we do hereby declare the following to be a full, clear, and exact description of the same, reference being had to the accompanying drawings forming part of this specification, in which—

Figure 1 is a perspective view of a windmill, showing the application of the improvements. Fig. 2 is a top plan view of the same. Fig. 3 is a sectional view of the tower and vertical axis of the wind-wheel. Fig. 4 is a detached view of the tubular axis and guide-plate. Fig. 5 is a detached view, showing the connection of the rudder with the head of the vertical axis; and Fig. 6 is a detached view of parts, showing the stops upon the rudder-arm and the head of the tubular axis.

Similar letters of reference in the accompanying drawings denote the same parts.

This invention has for its object to regulate and control the motion of wind-wheels for the purpose of rendering their operation more uniform and effective than heretofore. To this end the invention consists, first, in providing a windmill with a single tail-vane, or rudder, arranged to oscillate on its pivot as the wind shifts the position of the wind-wheel, to automatically carry the wind-wheel to a state of rest, with its edge to the wind, when the force of the latter becomes too great, and to return automatically to or toward its normal position as a tail-vane when the force of the wind decreases, as I will presently describe; secondly, in arranging a side vane or wind-gage to project laterally, beyond one side of the vertical axis, between the pivotal point thereof and the wind-wheel; thirdly, in the arrangement of the pitman or connecting rod for transmitting the power of the wind-wheel, together with the operating-cords of the rudder, to extend down through the vertical axis of the wind-wheel and through one or more perforated plates contained therein, for the purpose of preventing the operating-cords from becoming twisted or tangled with each other, or with the pitman, as the vertical axis rotates; fourthly, in the devices for controlling the position of the wind-wheel with respect to the vane or rudder, all as we will now proceed to describe.

In the accompanying drawings, A is the base of the machine, and B the tower, constructed in any suitable manner, to support the working parts at the proper elevation. The tower is preferably made from common plank in the form of a narrow frame or box, and receives at its top the vertical axis of the wind-wheel. This axis is composed of a tube or cylinder, D, and a suitable head, C, and is stepped in a rabbeted plate or block, E, secured within the tower, and provided with a central opening for the passage of the operating cords and the pitman or connecting rod. The cap F of the tower, together with the rabbeted plate, hold the axis in a vertical position, and permit it to turn freely and with but little friction. G is the wind-wheel, of ordinary or suitable construction, mounted upon a horizontal crank-shaft, H, having its bearings in uprights of the head C; and I is the pitman or connecting rod, by which the power of the wind-wheel is transmitted from the crank-shaft. This pitman extends down through the vertical axis, passing through one or more guide-plates, S, arranged in the tubular portion D. J is the vane or rudder, hinged to one end of the head so as to swing freely. In this example of my invention the vane or rudder is provided with two parallel arms, K, arranged a sufficient distance apart to receive the end of the head between them, and to which they are pivoted by a vertical shaft, L. M is a pulley, secured to the upper arm, and N is an enlarged bearing, formed upon or attached to the end of the lower arm. The vane or rudder is held in line, or nearly so, with the axis of the wind-wheel, when the latter is directly in the wind, by a stop, O, attached to the side of the head, as shown in Fig. 5; and is held parallel, or approximately parallel, to the plane of the wind-wheel, when the edge of the latter is in the wind, by stops V V attached to the head and lower arm K, respectively, as shown in Fig. 6. Q Q are the operating cords or chains, secured to opposite sides of the pulley M, and extending down through the tubular axis after passing over small guide-pulleys R, mounted upon the head of the axis, as shown. These cords also pass through the guide-plates S, which hold them out of contact with each other and the pitman.

By assembling the cords and pitman within the tubular axis they are brought within convenient reach of the operator for adjusting the speed and power of the mill, and their arrangement through the guide-plates prevents them from being twisted or cramped while turning with the vertical axis. The ends of the cords within the tower are weighted to preserve their tension during the movements of the vane or rudder, and prevent them from being tangled or displaced.

The office of the vane or rudder is to keep the wind-wheel in proper position to receive the wind upon its arms or sails, and to turn them more or less out of the wind as the force of the latter increases or diminishes, in order to maintain the wind-wheel at a uniform rate of speed, and to turn them entirely out of the wind to stop the rotation of the wheel.

When the mill is set for operation the vane occupies a position at right angles, or nearly so, to the plane of the wind-wheel, and is held against the stop O by attaching a weight, X, to one of the operating-cords.

In order that the vane shall swing laterally and overcome the gravity of the weight, some means should be employed to first carry the wind-wheel slightly out of the wind—that is to say, so that the wind shall strike it obliquely. When mechanical devices are employed for this purpose I prefer to use a side vane or wind-gage, T, secured to the vertical axis of the wind-wheel so as to project laterally from the axis of the wheel, in rear of the wheel, and in front of the pivoted joint of its vertical axis.

As the lateral deflection, from whatever cause, takes place, one or the other side of the rudder is presented more strongly to the wind, and the rudder therefore yields to its pressure, the yielding movement being controlled by the weight, which must be raised by this change in the relative position of the rudder. The degree of movement of the wind-wheel out of the wind is therefore measured by the power of the latter upon the rudder to raise the weight.

If the rudder were not flexible—that is to say, hinged or pivoted to the vertical axis of the wind-wheel, so as to swing as the wheel oscillates upon said axis—but held rigidly in its position parallel with the axis of the wind-wheel, it would completely check the lateral deflection of the wheel, and therefore the speed of the latter could not be regulated or controlled.

As more wind comes in contact with the wind-wheel than is required to furnish the requisite amount of power it causes the wheel to turn on its vertical axis and bring its face nearer and nearer parallel with the vane or rudder, and thus reduce the effective force of the wheel temporarily. When the wind decreases the weight automatically returns the wheel and vane to their normal or working positions.

When the parts are in position to receive the greatest effect from the wind the face of the wheel is set at a right angle to the sides of the rudder or vane, or nearly so, as above described, and as the wheel is turned from such position the effect of the wind upon it is regularly diminished—or, in other words, a less amount of force is exerted upon such wheel—and this ratio of diminution is continued until the face of the wheel and the sides of the vane are brought nearly or quite parallel with each other, the edge of the wheel being turned to the wind, at which time the effect of the wind upon the wheel, so far as the production of rotary motion thereof is concerned, will have ceased. This feature of the invention is of great importance, as it renders the mill self-regulating, and thus prevents the possibility of its being injured by the too rapid motion of its parts.

The wind-wheel may also be brought to a state of rest, with its edge to the wind, by changing the weight X to the opposite cord, or by applying other force to the latter, when the vane or rudder will be thrown around parallel, or nearly so, with the wheel, and retained in such position until the weight is again shifted to the other cord or the force removed.

I am aware that wind-wheels have heretofore been provided with two diverging tail-vanes, one of which is weighted and pivoted to the turn-table; and I am also aware that a single hinged tail-vane has been used and adapted to be firmly set at an angle to the axis of the wind-wheel; but these I do not claim as any part of my invention, since in none of them do the rudder and wind-wheel automatically approach and recede from each other.

Having thus described the invention, what we claim is—

1. A windmill having a single flexible tail-vane or rudder, combined with the wind-wheel, substantially as described.

2. A side vane or wind-gage, arranged to project laterally beyond one side of the vertical axis, between the pivotal point thereof and the wind-wheel, substantially as described.

3. The arrangement of the pitman and the operating-cords of the rudder to pass down through the vertical tubular axis of the wind-wheel, and to be held therein out of contact with each other by one or more perforated plates, arranged within said tubular axis, substantially as specified.

4. The stops O V, in combination with the vane or rudder and the head of the vertical axis of the wind-wheel, substantially as described, and for the purposes specified.

5. A windmill constructed with a pivoted or swinging main vane or rudder, and a side vane or wind-gage projecting laterally beyond the axis of the vertically-rotating wind-wheel, substantially as described, for the purposes specified.

HARRIET W. WHEELER,
*Executrix.*

Witnesses:
R. TATTERSHALL,
I. E. GOODALL.